United States Patent
Yonezawa

(10) Patent No.: US 7,089,788 B2
(45) Date of Patent: Aug. 15, 2006

(54) INTAKE AIR FLOW RATE MEASURING DEVICE OF AN INTERNAL COMBUSTION ENGINE

(75) Inventor: Fumiyoshi Yonezawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 4 days.

(21) Appl. No.: 10/828,341

(22) Filed: Apr. 21, 2004

(65) Prior Publication Data

US 2005/0097947 A1 May 12, 2005

(30) Foreign Application Priority Data

Nov. 10, 2003 (JP) ............................. 2003-380325

(51) Int. Cl.
*G01P 5/00* (2006.01)
(52) U.S. Cl. ...................... 73/118.2; 73/202; 73/116; 73/118.1
(58) Field of Classification Search ................ 73/118.2
See application file for complete search history.

(56) References Cited

U.S. PATENT DOCUMENTS 4,200,120 A * 4/1980 Kimata et al. .............. 137/613
5,804,718 A * 9/1998 Nagasaka et al. ............. 73/202
6,526,822 B1 * 3/2003 Maeda et al. ............. 73/204.21
6,647,776 B1 * 11/2003 Kohmura et al. ........ 73/204.21
2002/0023485 A1 * 2/2002 Kohmura et al. ............. 73/202

FOREIGN PATENT DOCUMENTS

| JP | 2002-005710 A | 1/2002 |
| JP | 2003-176740 A | 6/2003 |

* cited by examiner

*Primary Examiner*—Edward Lefkowitz
*Assistant Examiner*—Freddie Kirkland, III
(74) *Attorney, Agent, or Firm*—Sughrue Mion, PLLC

(57) ABSTRACT

A measurement structure that projects into an intake passage is provided with a shunt plate adjacent to a first passage that extends from an air inlet to an air outlet. A second passage is formed around the shunt plate so as to bypass the first passage. An air flow rate measuring element is disposed in the second passage. An edge of the shunt plate is located on a imaginary line or distant from the imaginary line to the second passage side, in which the imaginary line is parallel to the axis of the intake passage and passing through the top of the air inlet, whereby dust or liquid matter is prevented from entering the second passage. Alternatively, the shunt plate is provided with an inclined portion which is projected to the first passage so that the inclined portion is inclined toward the air outlet. As a further alternative, the shunt plate is provided with an inclined portion that is inclined toward the air inlet and has a through-hole.

11 Claims, 4 Drawing Sheets

INTAKE AIR FLOW RATE MEASURING DEVICE OF AN INTERNAL COMBUSTION ENGINE

BACKGROUND OF THE INVENTION

1. Field of the Invention

The present invention relates to an intake air flow rate measuring device of an internal combustion engine that measures the intake air flow rate of the internal combustion engine that is mounted on an automobile, for example, and is used for controlling the amount of fuel such as gasoline to be mixed into the intake air.

2. Description of the Related Art

Intake air flow rate measuring devices of the above kind are disclosed in JP-A-2002-5710, for example. An intake air flow rate measuring device that is shown in FIG. 5 of this publication is provided with a shunt pipe that projects into an intake passage of an internal combustion engine. The shunt pipe has a first passage extending approximately parallel with the intake passage, a shunt plate projecting into the first passage, a second passage that is formed around the shunt plate and bypasses the first passage, and an air flow rate measuring element disposed in the second passage. The air flow rate measuring element measures the intake air flow rate of the internal combustion engine in the intake passage on the basis of the flow rate or flow speed of the air in the second passage.

FIG. 1 of JP-A-2003-176740 shows an intake air flow rate measuring device in which a dust interrupting means such as a louver is disposed at the inlet of a bypass flow passage where an air flow rate measuring element is disposed.

However, in the intake air flow rate measuring device shown in FIG. 5 of JP-A-2002-5710 in which the shunt plate projects into the first passage, if the air passing through the intake passage contains dust or liquid matter, the dust or liquid matter is stopped by the shunt plate and introduced, together with the intake air flow, into the second passage where the air flow rate measuring element is disposed. The dust or liquid matter introduced into the second passage sticks to the side walls of the second passage or the air flow rate measuring element and disables correct intake air flow rate measurement.

In the intake air flow rate measuring device disclosed in JP-A-2003-176740, the dust interrupting means such as a louver is disposed at the inlet of the bypass flow passage where the air flow rate measuring element is disposed. This publication explains that the dust interrupting means decreases the kinetic energy of dust and thereby prevents a break of the measuring element even if the dust reaches it. However, intake air flow rate measuring devices provided with the dust interrupting means have problems that the pressure loss is large and that an intake air flow is disordered and made unstable by the dust interrupting means, which results in decrease in air flow rate measurement accuracy.

SUMMARY OF THE INVENTION

An object of the present invention is to solve the above problems of the prior art and to thereby provide an air flow rate measuring device of an internal combustion engine that is not provided with any special dust interrupting means and that is not prone to be influenced by dust or liquid matter that may be contained in an air flow and hence can measure the intake air flow rate more correctly.

An intake air flow rate measuring device of an internal combustion engine according to a first aspect of the invention comprises a measurement structure that is attached to an intake pipe of the internal combustion engine so as to project into an intake passage and measures an intake air flow rate of the internal combustion engine. The measurement structure includes an air inlet, an air outlet, a first passage, a shunt plate, a second passage and an air flow rate measuring element. The air inlet is located in the intake passage on an upstream side. The air outlet is located in the intake passage on a downstream side. The first passage extends from the air inlet to the air outlet. The shunt plate extends in a direction that crosses an axis of the intake passage and has an edge that is adjacent to the first passage. The second passage is formed around the shunt plate to bypass the first passage. The air flow rate measuring element is disposed in the second passage. Wherein the edge of the shunt plate is located on a imaginary line or distant from the imaginary line to the side of the second passage, in which the imaginary line is parallel to the axis of intake passage and passing through a top end of the air inlet.

An intake air flow rate measuring device of an internal combustion engine according to a second aspect of the invention comprises a measurement structure that is attached to an intake pipe of the internal combustion engine so as to project into an intake passage and measures an intake air flow rate of the internal combustion engine. The measurement structure includes an air inlet, an air outlet, a first passage, a shunt plate, a second passage and an air flow rate measuring element. The air inlet is located in the intake passage on an upstream side. The air outlet is located in the intake passage on a downstream side. The first passage extends from the air inlet to the air outlet. The shunt plate has a plate-like portion extending in a direction that crosses an axis of the intake passage and an inclined portion that is continuous with the plate-like portion and projects into the first passage so as to be inclined toward the air outlet. The second passage is formed around the shunt plate to bypass the first passage. The air flow rate measuring element is disposed in the second passage.

An intake air flow rate measuring device of an internal combustion engine according to a third aspect of the invention comprises a measurement structure that is attached to an intake pipe of the internal combustion engine so as to project into an intake passage and measures an intake air flow rate of the internal combustion engine. The measurement structure includes an air inlet, an air outlet, a first passage, a shunt plate, a second passage and an air flow rate measuring element. The air inlet is located in the intake passage on an upstream side. The air outlet is located in the intake passage on a downstream side. The first passage extends from the air inlet to the air outlet. The shunt plate has a plate-like portion extending in a direction that crosses an axis of the intake passage and an inclined portion that is continuous with the plate-like portion, projects into the first passage so as to be inclined toward the air inlet, and has a through-hole extending parallel with the axis of the intake passage. The second passage is formed around the shunt plate to bypass the first passage. The air flow rate measuring element is disposed in the second passage.

In the air flow rate measuring device of an internal combustion engine according to the first aspect of the invention, the edge of the shunt plate is located on a imaginary line or distant from the imaginary line to the second passage side, in which the imaginary line is parallel to the axis of the intake passage and passing through a top of the inlet. Therefore, even if an intake air flow contains dust or liquid matter, the dust or liquid matter is not stopped by the shunt plate and hence is prevented from entering the second passage where the air flow rate measuring element is disposed. Therefore, the air flow rate measurement can be prevented from being impaired by dust or liquid matter without providing any special dust interrupting means, and hence it can be performed with higher accuracy.

In the air flow rate measuring device of an internal combustion engine according to the second aspect of the invention, the inclined portion that is continuous with the plate-like portion of the shunt plate and projects into the first passage is inclined toward the air outlet. Therefore, even if an intake air flow contains dust or liquid matter, the dust or liquid matter is guided to the air outlet by the inclined portion and hence is prevented from entering the second passage where the air flow rate measuring element is disposed. Therefore, the air flow rate measurement can be prevented from being impaired by dust or liquid matter without providing any special dust interrupting means, and hence it can be performed with higher accuracy.

In the air flow rate measuring device of an internal combustion engine according to the third aspect of the invention, the inclined portion that is continuous with the plate like portion of the shunt plate and projects into the first passage has the through hole extending parallel with the axis of the intake passage though it is inclined toward the air inlet. Therefore, even if an intake air flow contains dust or liquid matter, the dust or liquid matter goes through the through-hole of the inclined portion and is guided to the air outlet and hence is prevented from entering the second passage where the air flow rate measuring element is disposed. Therefore, the air flow rate measurement can be prevented from being impaired by dust or liquid matter without providing any special dust interrupting means, and hence it can be performed with higher accuracy.

DESCRIPTION OF THE PREFERRED EMBODIMENTS

Several embodiments of the present invention will be hereinafter described with reference to the drawings.

Embodiment 1

Figure 1:
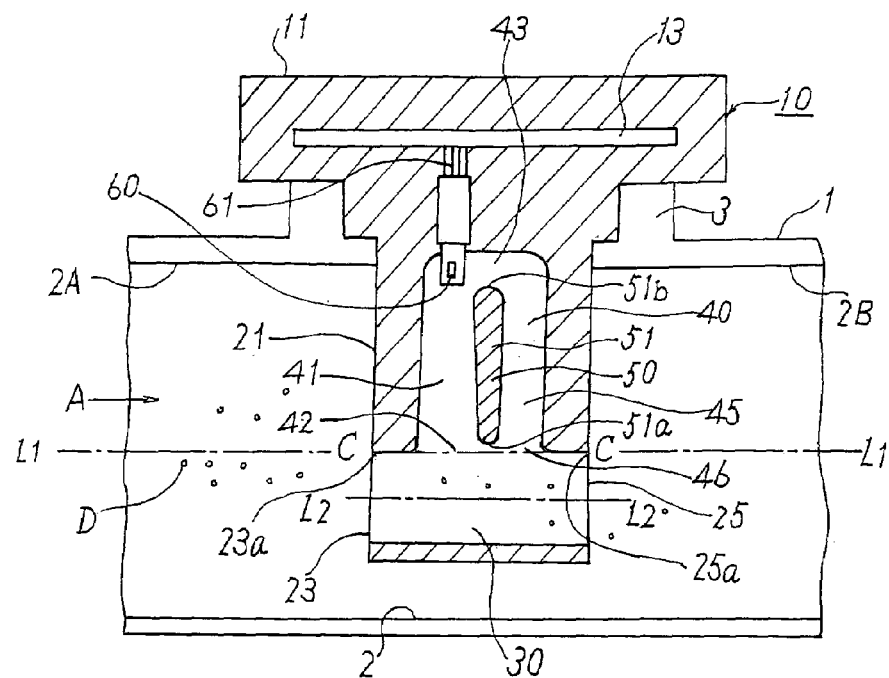
FIG. 1 is a sectional view of an air flow rate measuring device of an internal combustion engine according to a first embodiment of the present invention.

FIG. 1 is a sectional view of an air flow rate measuring device of an internal combustion engine according to a first embodiment of the invention. The first embodiment corresponds to a first aspect of the invention. The air flow rate measuring device according to the first embodiment is equipped with a measurement structure 10 that is disposed in an intake pipe 1 of the internal combustion engine. The intake pipe 1 has a circular cross-section, for example, and an intake passage 2 having a circular cross-section is formed inside the intake pipe 1. The intake pipe 1 and the intake passage 2 have a common center axis L1—L1. Intake air flows through the intake passage 2 in the direction indicated by an arrow A in FIG. 1. Reference symbols 2A and 2B denote the upstream side and the downstream side of the intake passage 2, respectively. It is desirable that the measurement structure 10 be disposed at a position where the axis L1—L1 of the intake pipe 1 expends in the horizontal direction. An attachment support 3 is formed at the top of the outer circumference of a portion of the intake pipe 1 where the axis L1—L1 expends in the horizontal direction.

The measurement structure 10 is attached to the intake pipe 1 so as to rest on the attachment support 3 and to project downward into the intake passage 2. The measurement structure 10 has an outside portion 11 that is located outside the intake pipe 1 and an inside portion 21 that projects into the intake passage 2. The inside portion 21 extends from the outside portion 11 in the direction perpendicular to the axis L1—L1 of the intake pipe 1 and projects from above into the intake passage 2. The outside portion 11 and the inside portion 21 of the measurement structure 10 are formed integrally with a resin, for example. To reduce the degree of disorder that is caused in an intake air flow flowing through the intake passage 2 by the inside portion 21, the inside portion 21 assumes a cylinder, a prism with many faces, or a wing-shaped column.

The outside portion 11 of the measurement structure 10 has a built-in electronic circuit unit 13, which, for example, is mainly a circuit board. An integrated circuit for calculating a flow rate of intake air flowing through the intake passage 2 and other circuits are provided on the circuit board.

An air inlet 23, an air outlet 25, a first passage 30, and a second passage 40 are formed in the inside portion 21. The air inlet 23 and the air outlet 25 are formed in the circumferential surface of the inside portion 21 so as to be opposed to each other. The air inlet 23 is disposed as to as face the upstream side 2A of the intake passage 2, and the air outlet 25 is disposed as to as face the downstream side 2B of the intake passage 2. The first passage 30 extends straightly from the air inlet 23 to the air outlet 25 in such a manner that its center axis L2—L2 is parallel with the axis L1—L1 of the intake passage 2.

The air inlet 23 and the air outlet 25 have arbitrary shapes such as circles, ellipses, or rectangles.

A shunt plate 50 is disposed in the inside portion 21, and the second passage 40 as a bypass of the first passage 30 is formed around the shunt plate 50. The shunt plate 50 is integrated with the inside portion 21 by using the same material. The shunt portion 50 has a plate-like portion 51 that is located above the first passage 30 so as to extend in the direction perpendicular to the axis L1—L1 of the intake passage 2 and that has a bottom, first edge 51a and a top, second edge 51b. The first edge 51a is adjacent to the first passage 30.

The measurement structure 10 projects downward into the intake passage 2 and hence the second passage 40 is located above the first passage 30. The second passage 40 has an inlet-side passage 41, and internal passage 43, and an outlet-side passage 45. The inlet-side passage 41 extends upward from a point 42 of branching from the first passage 30 in the direction perpendicular to the axis L1—L1 of the intake passage 2. The internal passage 43 is bent at the top of the inlet-side passage 41 approximately at the right angle and extends in the direction parallel with the axis L1—L1 of the intake passage 2. The second edge 51b of the plate-like portion 51 of the shunt plate 50 is adjacent to the internal passage 43. The outlet-side passage 45 is bent at the end of the internal passage 43 approximately at the right angle, extends in the direction perpendicular to the axis L1—L1 of the intake passage 2, and reaches a point 46 of merging into the first passage 30.

An air flow rate measuring element 60 projects into the internal passage 45 of the second passage 40. The air flow rate measuring element 60 measures a flow speed of air passing through the second passage 40 and generates a signal that is proportional to the measured flow speed, or directly measures a flow rate of air passing through the second passage 40 and generates a signal that is proportional to the measured flow rate. The signal generated by the air flow rate measuring element 60 is supplied to the electronic circuit unit 13 via connection lines 61, and the electronic circuit unit 13 generates a signal that is proportional to a flow rate of air passing through the intake passage 2.

In the first embodiment, an imaginary line C—C is assumed that extends from the top end 23a (close to the second passage 40) of the air inlet 23 in the direction parallel with the axis L1—L1 of the intake passage 2. In the first embodiment, the imaginary line C—C goes through the top end 25a (close to the second passage 40) of the air outlet 25. The bottom, first edge 51a of the plate-like portion 51 of the shunt plate 50 is adjacent to the imaginary line C—C; that is, the first edge 51a is located on the imaginary line C—C or located above the imaginary line C—C (i.e., on the side of the second passage 40). If an air flow going through the intake passage 2 contains dust or liquid matter D, the dust or liquid matter D flows through the intake passage 2 together with the air flow along the axis L1—L1 and passes through the first passage 30 along the axis L2—L2. Since the first edge 51a of the shunt plate 50 is located on or above the imaginary line C—C, the dust or liquid matter D can be prevented from entering the passage above the imaginary line C—C, that is, the second passage 40. Therefore, the dust or liquid matter D can be prevented from sticking to the air flow rate measuring element 60 that is disposed in the second passage 40 and hence from lowering the measurement accuracy of the air flow rate measuring element 60.

In addition, in the first embodiment, with respect to a portion in which the intake pipe 1 becomes horizontal, the measurement structure 10 projects into the intake passage 2 from above at the position where the intake passage 2 extends in the horizontal direction and the second passage 40 is located above the first passage 30. Therefore, the dust or liquid matter D tends to go down gradually in the intake passage 2 and the first passage 30 because of the gravity acting thereon. This makes it possible to more reliably prevent the dust or liquid matter D from entering the second passage 40.

Embodiment 2

Figure 2:
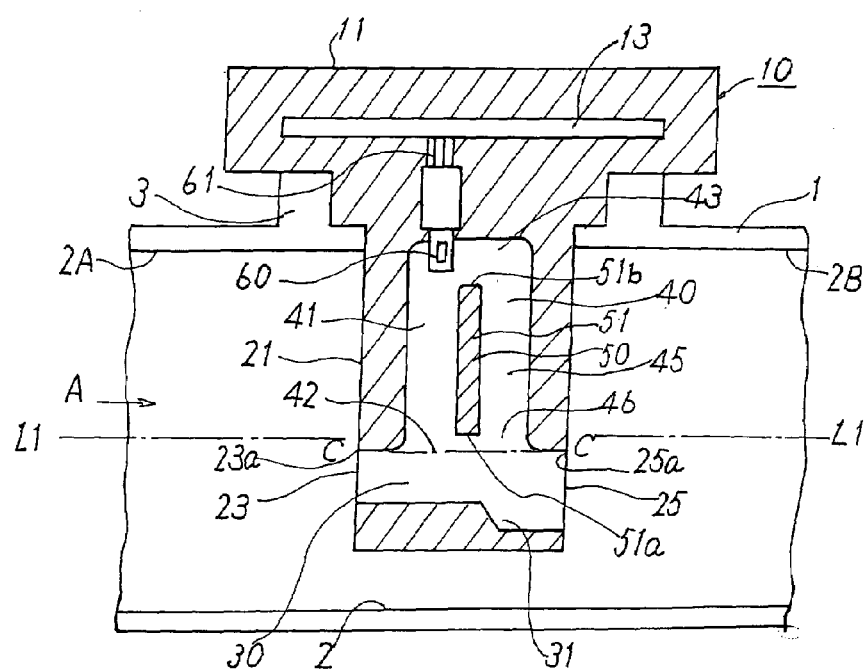
FIG. 2 is a sectional view of an air flow rate measuring device of an internal combustion engine according to a second embodiment of the invention.
Figure 3:
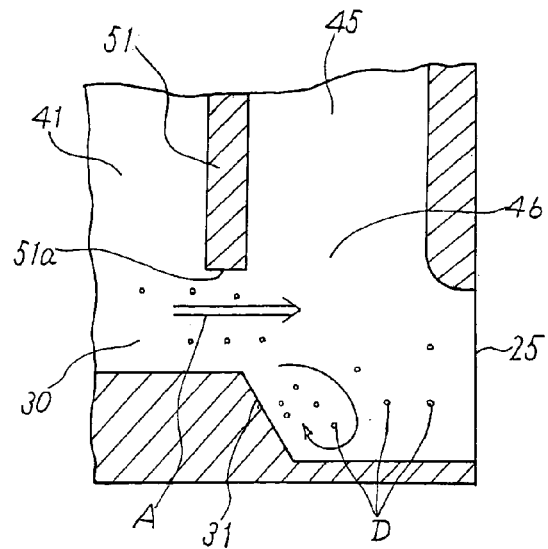
FIG. 3 is an enlarged sectional view of a part of the air flow rate measuring device of FIG. 2.

FIGS. 2 and 3 show an air flow rate measuring device according to a second embodiment of the invention. FIG. 2 is a sectional view of the entire air flow rate measuring device and FIG. 3 is an enlarged sectional view of a part of it.

The second embodiment also corresponds to the first aspect of the invention, and is an improved version of the first embodiment. More specifically, a step portion 31 is formed at the merging point of the first passage 30 and the second passage 40, that is, in the bottom portion of the first passage 30 that is opposed to the outlet-side passage 45. The step portion 31 is to increase the cross-section of the first passage 30 there. In the second embodiment, the step portion 31 extends from the portion of the first passage 30 that is opposed to the outlet-side passage 45 of the second passage 40 to the air outlet 25. The configuration of the second embodiment other than the step portion 31 is the same as that of the first embodiment and hence will not be described. The members in FIG. 2 having the same members in FIG. 1 are given the same reference symbols as the latter.

In the second embodiment, part of an air flow going through the intake passage 2 swerves from the course at the step portion 31, whereby dust or liquid matter D contained in the air flow is trapped temporarily in the step portion 31 as shown in FIG. 3. Then, the dust or liquid matter D flows toward the downstream side 2B together with the air flow. The trapping by the step portion 31 makes it possible even more reliably prevent the dust or liquid matter D from entering the second passage 40. Since the step portion 31 is formed in the portion of the first passage 30 that is opposed to the outlet-side passage 45 of the second passage 40, the swerving of part of an air flow that is caused by the step portion 31 does not impair the entrance of the air flow into the second passage 40 and hence the measurement accuracy of the air flow rate measuring element 60 can be kept high. If the step portion 31 were formed in the portion of first passage 30 that is opposed to the inlet-side passage 41 of the second passage 40, the swerving of part of an air flow that is caused by the step portion 31 would impair the entrance of the air flow into the second passage 40 and might lower the measurement accuracy of the air flow rate measuring element 60.

Embodiment 3

Figure 4:
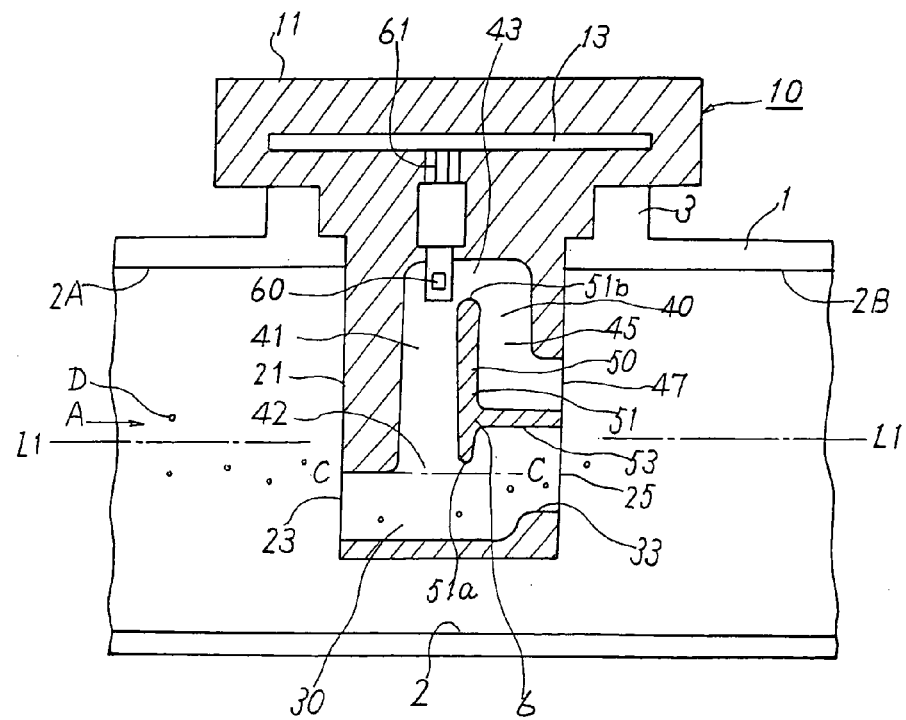
FIG. 4 is a sectional view of an air flow rate measuring device of an internal combustion engine according to a third embodiment of the invention.

FIG. 4 shows an air flow rate measuring device according to a third embodiment of the invention. The third embodiment also corresponds to the first aspect of the invention.

In the third embodiment, the plate-like portion 51 of the shunt plate 50 has a branch 53. The plate-like portion 51 extends in the direction perpendicular to the axis L1—L1 of the intake passage 2 and the branch 53 extends from the plate-like portion 51 in the horizontal direction, that is, in the direction parallel with the axis L1—L1 of the intake passage 2. The branch 53 extends to the position that is flush with the portion of the circumferential surface of the inside portion 21 that faces the downstream side 2B, whereby the outlet-side passage 45 is given an auxiliary air outlet 47 that is separate from the air outlet 25. A step portion 33 is formed at the bottom of the air outlet 25 so as to correspond to the branch 53. The step portion 33 is to move the bottom end 25b of the air outlet 25 upward because the top end 25a of the air outlet 25 is moved upward as a result of the formation of the branch 53. The other part of the configuration of the third embodiment is the same as that of the first embodiment and hence will not be described. The members in FIG. 4 having the same members in FIG. 1 are given the same reference symbols as the latter.

In the first embodiment in which the outlet-side passage 45 of the second passage 40 merges into the first passage 30 at the merging point 46, disorder occurring in an air flow near the merging point 46 may obstruct the entrance of part of the air flow into the second passage 40. In contrast, in the third embodiment in which the branch 53 is formed and the air outlet 25 of the first passage 30 is separated from the auxiliary air outlet 47 of the second passage 40, no merging point 46 exists and hence the problem that disorder occurs in an air flow near the merging point 46 is solved. Therefore, whereas the entrance of dust or liquid matter D into the second passage 40 is prevented, an air flow is stably introduced into the second passage 40 and the measurement accuracy of the air flow rate measuring element 60 can thereby be increased.

Embodiment 4

Figure 5:
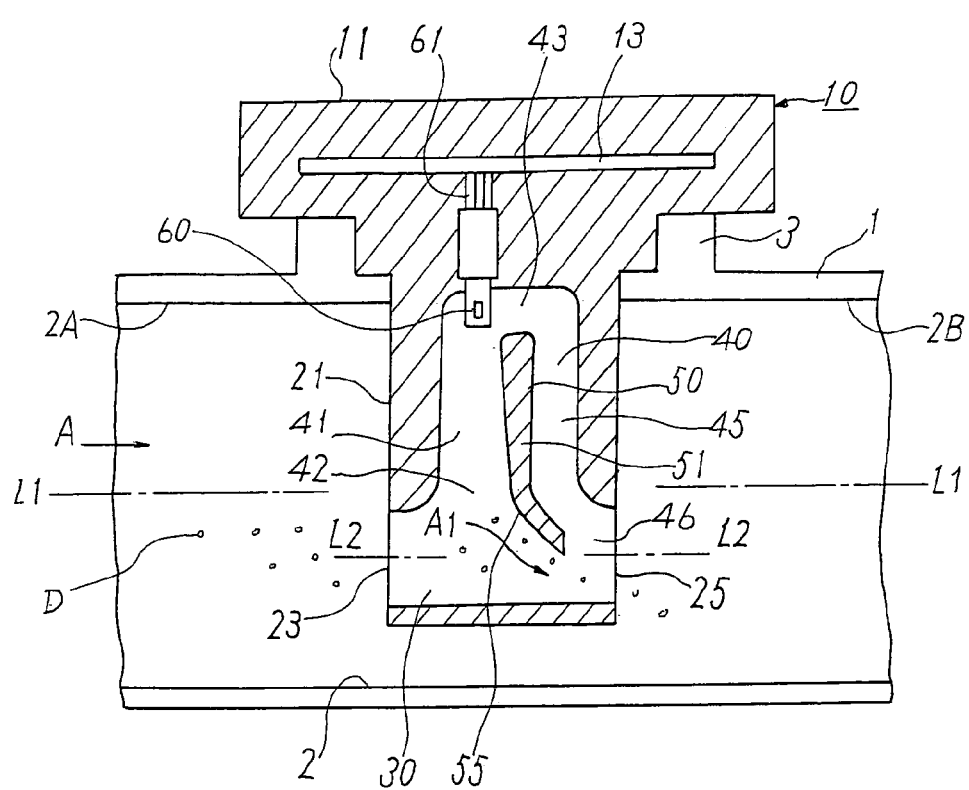
FIG. 5 is a sectional view of an air flow rate measuring device of an internal combustion engine according to a fourth embodiment of the invention.

FIG. 5 shows an air flow rate measuring device according to a fourth embodiment of the invention. The fourth embodiment corresponds to a second aspect of the invention.

In the fourth embodiment, the shunt plate 50 has an inclined portion 55 in addition to the plate-like portion 51. The inclined portion 55 is continuous with and integral with the plate-like portion 51. The inclined portion 55 projects from the bottom of the plate-like portion 51 into the first passage 30 and is inclined toward the air outlet 25. The other part of the configuration of the fourth embodiment is the same as that of the first embodiment and hence will not be described. The members in FIG. 5 having the same members in FIG. 1 are given the same reference symbols as the latter.

In the fourth embodiment, when an air flow containing dust or liquid matter D goes into the first passage 30, the air flow hits the inclined portion 55 that projects into the first passage 30. Since the inclined portion 55 is inclined toward the air outlet 25, the air flow goes along the inclined portion 55 (indicated by an arrow A1 in FIG. 5) toward the air outlet 25. Therefore, the dust or liquid matter D contained in the air flow goes together with the air flow toward the air outlet 25. Therefore, the dust or liquid matter D can be prevented from entering the second passage 40.

Embodiment 5

Figure 6:
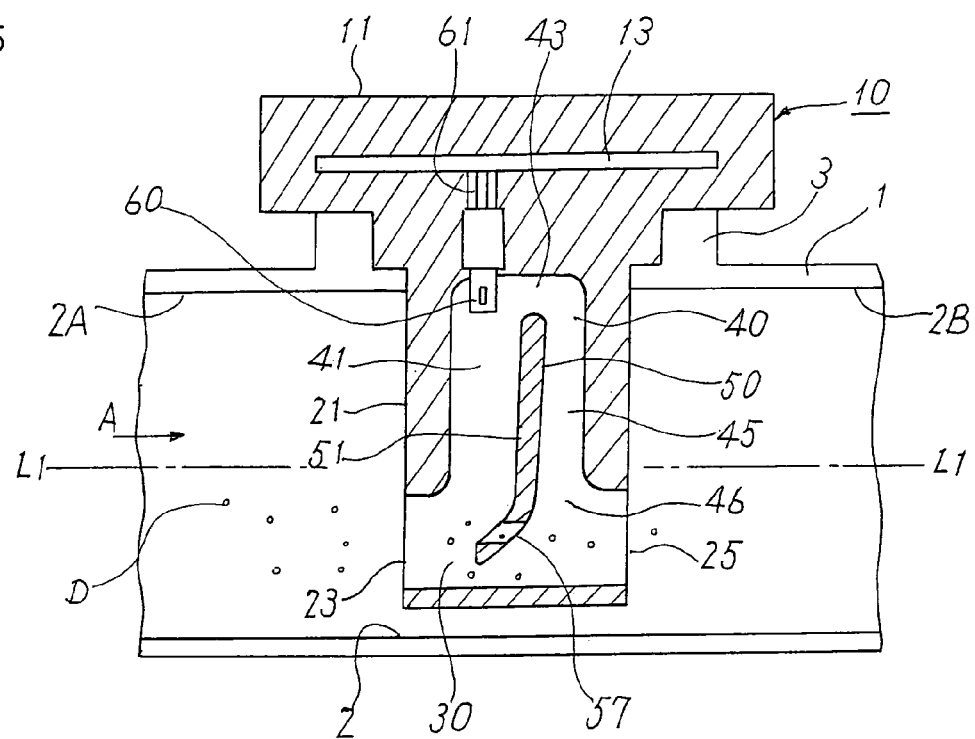
FIG. 6 is a sectional view of an air flow rate measuring device of an internal combustion engine according to a fifth embodiment of the invention.
Figure 7:
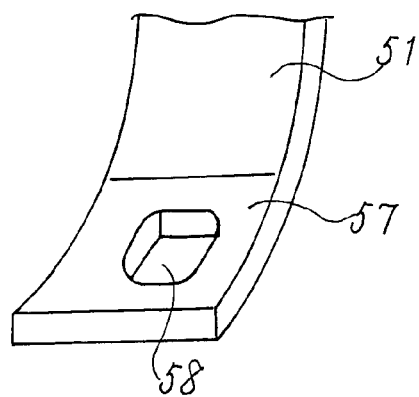
FIG. 7 is an enlarged sectional view of a part of the air flow rate measuring device of FIG. 6.

FIGS. 6 and 7 show an air flow rate measuring device according to a fifth embodiment of the invention. FIG. 6 is a sectional view of the entire air flow rate measuring device and FIG. 7 is an enlarged sectional view of an inclined portion 57 of the shunt plate 50.

The fifth embodiment corresponds to a third aspect of the invention. In the fifth embodiment, the shunt plate 50 has an inclined portion 57 in addition to the plate-like portion 51. The inclined portion 57 is continuous with and integral with the plate-like portion 51. The inclined portion 55 projects from the bottom of the plate-like portion 51 into the first passage 30 and is inclined toward the air inlet 23. Further, as shown in FIG. 7 in an enlarged manner, in the central portion of inclined portion 57 a through-hole 58 is formed through the inclined portion 57 in the direction parallel with the axis L1—L1 of the intake passage 2. The other part of the configuration of the fifth embodiment is the same as that of the first embodiment and hence will not be described. The members in FIG. 6 having the same members in FIG. 1 are given the same reference symbols as the latter.

In the fifth embodiment, when an air flow containing dust or liquid matter D goes into the first passage 30, the air flow hits the inclined portion 57 because the inclined portion 57 projects into the first passage 30 and is inclined toward the air inlet 23. However, since the inclined portion 57 to which the air flow fits has the through-hole 58, a main part of the air flow that hits the inclined portion 57 goes through the through-hole 58 toward the air outlet 25. As a result, most of the dust or liquid matter D contained in the air flow goes through the through-hole 58 together with that part of the air flow toward the air outlet 25. Therefore, the dust or liquid matter D can be prevented from entering the second passage 40.

The intake air flow rate measuring device of an internal combustion engine according to the invention is to measure the flow rate of air that flows through the intake pipe of the internal combustion engine that is mounted on an automobile, for example, and is used for controlling the amount of fuel such as gasoline to be mixed into the intake air.

What is claimed is:

1. An intake air flow rate measuring device of an internal combustion engine, comprising a measurement structure that is attached to an intake pipe of the internal combustion engine so as to project into an intake passage and measures an intake air flow rate of the internal combustion engine, the measurement structure including:
    an air inlet located in the intake passage on an upstream side;
    an air outlet located in the intake passage on a downstream side;
    a first passage extending from the air inlet to the air outlet;
    a shunt plate extending in a direction that crosses an axis of the intake passage and having a bottom edge that is adjacent to the first passage;
    a second passage formed around the shunt plate to bypass the first passage; and
    an air flow rate measuring element disposed in the second passage,
    wherein the bottom edge of the shunt plate is located on or above an imaginary line in which the imaginary line is parallel to the axis of the intake passage and passing through an uppermost edge of the air inlet.

2. The intake air flow rate measuring device according to claim 1, wherein the second passage comprises an inlet-side passage extending in a direction that crosses the first passage, an internal passage that is bent from the inlet-side passage so as to extend approximately parallel with the axis of the intake passage, and an outlet-side passage that is bent from the internal passage and merges into the first passage.

3. The intake air flow rate measuring device according to claim 2, wherein the measurement structure includes a step portion that is adjacent to the intake passage so as to be opposed to the outlet-side passage of the second passage and to widen the first passage.

4. The intake air flow rate measuring device according to claim 2, wherein the measurement structure is attached to the intake pipe in such a manner that the internal passage of the second passage is located above the first passage.

5. The intake air flow rate measuring device according to claim 4, wherein the first passage extends approximately parallel with the axis of the intake passage and a top end of the air outlet is approximately at the same height as that of the air inlet.

6. The intake air flow rate measuring device according to claim 1, wherein the shunt plate has a branch that extends approximately parallel with the axis of the intake passage and forms an auxiliary air outlet of the second passage that is separate from the air outlet of the measurement structure.

7. The intake air flow rate measuring device according to claim 1, wherein the intake axis extends in a substantially horizontal direction.

8. The intake air flow rate measuring device according to claim 1, further comprising:
    an inside portion disposed inside of the intake pipe and housing an air flow rate measuring element for generating a flow signal;

an outside portion disposed on the outside of the intake pipe housing an electronic circuit for calculating the intake flow rate; and an electrical connecting line to supply the flow signal to the electronic circuit.

9. An intake air flow rate measuring device of an internal combustion engine, comprising a measurement structure that is attached to an intake pipe of the internal combustion engine so as to project into an intake passage and measures an intake air flow rate of the internal combustion engine, the measurement structure including:

an air inlet located in the intake passage on an upstream side;

an air outlet located in the intake passage on a downstream side;

a first passage extending from the air inlet to the air outlet;

a plate-like shunt plate having a plate-like portion extending in a direction that crosses an axis of the intake passage and having first inclined surface on an upstream side of the plate-like portion and a second inclined surface on a downstream side of the plate-like portion wherein both the first and second inclined portions are inclined toward the downstream side of the first passage and projects into the first passage;

a second passage formed around the shunt plate to bypass the first passage; and an air flow rate measuring element disposed in the second passage.

10. An intake air flow rate measuring device of an internal combustion engine, comprising a measurement structure that is attached to an intake pipe of the internal combustion engine so as to project into an intake passage and measures an intake air flow rate of the internal combustion engine, the measurement structure including:

an air inlet located in the intake passage on an upstream side;

an air outlet located in the intake passage on a downstream side;

a first passage extending from the air inlet to the air outlet;

a shunt plate having a plate-like portion extending in a direction that crosses an axis of the intake passage and an inclined portion that is continuous with the plate-like portion, projects into the first passage so as to be inclined toward the air inlet, and has a through-hole extending parallel with the axis of the intake passage;

a second passage formed around the shunt plate to bypass the first passage; and an air flow rate measuring element disposed in the second passage.

11. An intake air flow rate measuring device of an internal combustion engine, comprising a measurement structure that is attached to an intake pipe of the internal combustion engine so as to project into an intake passage and measures the intake air flow rate of the internal combustion engine, the measurement structure comprising:

an air inlet located in the intake passage on an upstream side;

an air outlet located in the intake passage on a downstream side;

a first passage extending from the air inlet to the air outlet;

a shunt plate extending in a direction that crosses an axis of the intake passage and having a bottom edge that is adjacent to the first passage;

a second passage formed around the shunt plate to bypass the first passage; and an air flow rate measuring element disposed in the second passage, wherein the air inlet has an inlet end positioned at the side of the passage, and the bottom edge of the shunt plate is located on or above an imaginary line, wherein said imaginary line is parallel to the axis of the intake passage and passes through an uppermost edge of the air inlet.

* * * * *